United States Patent [19]

Davis et al.

[11] 4,256,861

[45] Mar. 17, 1981

[54] PROCESS FOR PRODUCING POLYETHERESTER ELASTOMER

[75] Inventors: Burns Davis; Robert B. Barbee, both of Kingsport, Tenn.

[73] Assignee: Eastman Kodak Company, Rochester, N.Y.

[21] Appl. No.: 106,964

[22] Filed: Dec. 26, 1979

[51] Int. Cl.$^3$ .............................................. C08G 63/76
[52] U.S. Cl. .................................. 525/437; 528/272; 528/301; 528/302
[58] Field of Search ................ 525/437; 528/272, 301, 528/302

[56] References Cited

U.S. PATENT DOCUMENTS

| | | | |
|---|---|---|---|
| 3,261,812 | 7/1966 | Bell et al. | 528/301 X |
| 3,523,923 | 8/1970 | Smith et al. | 528/301 X |
| 4,075,180 | 2/1978 | Davis et al. | 528/309 X |
| 4,155,889 | 5/1979 | Fagerburg et al. | 528/272 X |

*Primary Examiner*—Lucille M. Phynes
*Attorney, Agent, or Firm*—John F. Stevens; Daniel B. Reece, III

[57] ABSTRACT

Disclosed is a method for producing a relatively high molecular weight copolyester which comprises the steps of (a) melt-phase copolymerizing to an inherent viscosity of about 0.50 to about 1.10 a dibasic acid component and a glycol component, the dibasic acid component consisting essentially of trans-1,4-cyclohexanedicarboxylic acid and the glycol component comprising, from about 97 to about 70 mol percent 1,4-cyclohexanedimethanol, about 3 to about 30 mol percent of a glycol having 2 to 5 carbon atoms and from about 15 to about 80 weight percent of the total polymer of a polyalkyleneether glycol, and (b) solid-phase polymerizing the copolyester from step (a) at a temperature of from about 110° C. to about 200° C. to a higher inherent viscosity of from about 0.60 to about 2.50, the higher inherent viscosity being at least 0.10 higher than the inherent viscosity reached in step (a).

Such a process using a particular acid and particular mixture of glycols allows inherent viscosity build-up without use of temperature high enough to cause thermal degradation and the resulting odor and color formation.

5 Claims, No Drawings

PROCESS FOR PRODUCING POLYETHERESTER ELASTOMER

BACKGROUND OF THE INVENTION

1. Field of the Invention

This invention relates to a process for producing relatively high molecular weight copolyesters of 1,4-cyclohexanedicarboxylic acid and a mixture of three glycols by a combination of melt-phase polycondensation followed by solid-phase polycondensation.

2. Description of the Prior Art

Solid-phase polymerization following melt-phase polymerization is well known in the art. Normally such solid-phase polymerization is carried out at temperatures around 200° C.

The advantages of this invention are that polyesters having improved properties such as lower odor and lower color can be produced. If a polyester is prepared to high molecular weight in the melt, the high temperatures needed can cause excessive degradation causing odor and color formation. By use of the solid-phase process of this invention, the high molecular weight copolyesters can be prepared at much lower temperatures significantly reducing the possibility of degradation. The process of this invention is particularly useful since part of the copolyester is a polyalkyleneether glycol. Polyalkyleneether glycols have poor thermal stability and it is therefore, desirable to carry out the polymerization at as low a temperature as possible.

U.S. Pat. No. 3,801,547 discloses a solid phase polycondensation process for preparing polyesters derived from an acid component of at least 70 mole percent terephthalic acid and a glycol component of at least 70 mol percent 1,4-butanediol. The polyesters, as disclosed in this patent are prepared by heating solid partially polymerized copolyester having an inherent viscosity of at least about 0.8 to a temperature of about 140°–220° C. Other patents disclosing solid phase polymerization of polyesters include U.S. Pat. Nos. 3,068,204; 3,075,952; 3,117,950 and 3,254,055. Patents disclosing polyetherester elastomers based on polytetramethylene terephthalate include U.S. Pat. Nos. 3,651,014; 3,763,109; 3,755,146; 3,023,192 and 3,784,520. Polyetheresters containing 1,4-cyclohexanedimethanol and polytetramethylene glycol are disclosed in U.S. Pat. Nos. 3,261,812 and 3,243,413.

The present invention provides a process for producing a relatively high molecular weight copolyester. The method comprises, first, melt-phase copolymerizing to an inherent viscosity of about 0.50 to about 1.10 a dibasic acid component and a glycol component, the dibasic acid component consisting essentially of 1,4-cyclohexanedicarboxylic acid having a transisomer content of at least 70%. The glycol component comprises, based on 100 mol percent glycol, from about 97 to about 70 mol percent 1,4-cyclohexanedimethanol, about 3 to about 30 mol percent of a glycol having 2 to 5 carbon atoms and from about 15 to about 80 weight percent of the total polymer of a polyalkyleneether glycol having a carbon to oxygen atom ratio of from 2 to 1 to 4 to 1 and a molecular weight of from about 400 to about 4000. As the second step, the relatively low inherent viscosity polymer obtained from the first step is solid-phase polymerized in particle at a temperature of from about 110° C. to about 200° C. to a higher inherent viscosity of from about 0.60 to about 2.50, the higher inherent viscosity being at least 0.10 higher than the inherent viscosity reached in the first step.

The elastomeric polyetheresters so produced have utility as a molding, extruding and sheet forming material, useful for example in the production of plastic tubes, bags, etc., where good physical properties are required.

SUMMARY OF THE INVENTION

According to the present invention, a method is provided for producing relatively high molecular weight copolyesters by a combination of melt-phase copolymerization followed by solid-phase copolymerization. By using a combination of low molecular weight glycols in the particular polyester system, the inherent viscosity of the copolyester can be increased at greater rates than expected at low temperatures.

The copolyester is derived from an acid component which consists essentially of 1,4-cyclohexanedicarboxylic acid having a trans isomer content of at least 50%, or esters thereof which are commercially available materials. Small amounts, i.e., up to about 10 mol percent, of other acids such as aromatic or aliphatic dicarboxylic acids (for example, terephthalic, isophthalic, or straight chain aliphatic dicarboxylic acids) may be included.

The glycol component of the copolyester consists of a mixture of three glycols. Based on a total glycol mol percent of 100, the glycol component comprises from about 70 to about 97 mol percent 1,4-cyclohexanedimethanol, and about 30 to about 3 mol percent of a glycol having from 2 to 5 carbon atoms, preferably ethylene glycol. The glycol component further comprises from about 15 to about 80 weight percent, based on the total weight of the polymer, of a polyalkyleneether glycol which has a carbon to oxygen atom ratio of from 2 to 1 to 4 to 1 and a molecular weight of from about 400 to about 4000.

The 1,4-cyclohexanedimethanol is a commercially available material. Commercially available glycols having 2 to 5 carbon atoms include ethylene glycol, propylene glycol, 1,4-butanediol, neopentyl glycol, etc. Commercially available polyalkyleneether glycols include polyethyleneether glycol, polypropyleneether glycol and polytetramethyleneether glycol. Copolyalkyleneether glycols can also be used such as copolypropyleneetherethyleneether glycols.

According to the process of this invention, the melt phase copolymerization is carried out using conventional techniques, preferably by the well known ester interchange reaction, to an I.V. of from about 0.50 to about 1.10.

A preferred procedure involves heating and stirring trans-dimethyl-1,4-cyclohexane-dicarboxylate, with the glycol having 2 to 5 carbon atoms, the 1,4-cyclohexanedimethanol and the polyalkyleneether glycol. Among the preferred catalysts is titanium. An excess of glycol is normally used. The reaction mixture is stirred at a temperature of 175° C. to 250° C. for a period of 10 to 180 minutes. Heat is then increased to about 230° C. to about 275° C. and the reaction mixture is put under reduced pressure to remove excess glycol. The heat is then removed and the reaction brought to atmospheric pressure. The reaction time is dependent on temperature, catalyst, glycol excess and equipment. Other esterification procedures will be obvious to those skilled in the art.

The copolymer is then formed into pellets which are suitable for solid phase copolymerization.

According to this invention, a polycondensation step in the solid phase is utilized to complete the polymerization of the copolyester or to carry it to molecular weights higher than those achieved by melt condensation. At the end of the partial melt polycondensation as it is described above the copolyester typically has an inherent viscosity of at least 0.8. In order to achieve higher inherent viscosity the copolyester particles are subjected to additional processing.

The copolyester particles have a particle size not greater than about 5 mesh, preferably 5 to 20 mesh and most preferably 6 to 12 mesh as determined by the U.S. Bureau of Standards, Standard Screen Series. Much smaller particles, e.g. 100 mesh, can be used but are not preferred.

The particles required for the solid phase polycondensation can be formed by any conventional techniques. The partially condensed material from the melt can be cooled by casting on a cold wheel and shredding the resulting sheet. A preferred technique involves forming a strand of the melt, quenching it with cold water and cutting the strand into pellets of about 0.62 in. to 0.125 in. in diameter. The use of these large particles avoids many of the complications previously encountered with solid phase polycondensate.

The particles are subjected to the temperature of about 110°-200° C., preferably about 10° C. below the polymer stick temperature for a period of about 1 to 72 hours, usually for about 4 to 48 hours. Significant advantages are realized in increasing the inherent viscosity at these relatively low temperatures at which little or no thermal degradation occurs to cause odor and color formation.

The solid phase polycondensation takes place in an inert gas stream or in a vacuum. Preferred inert gas streams are nitrogen, carbon dioxide and carbon monoxide. When an inert gas stream is used, the pressure may range from reduced pressures as low as about 1 mm. Hg up to superatmospheric pressure, but operation at about 1 atmosphere is preferred. If vacuum is to be utilized alone a pressure of less than about 1 mm. Hg should be maintained. The use of an inert gas stream or vacuum is essential to remove polymerization by-products, normally the low molecular weight diol, from the space surrounding the copolyester particles as the polymerization is reversible in the presence of the by-products. The use of an inert gas stream at about atmospheric pressure is preferred.

The solid phase polycondensation can be carried out in batch and continuous equipment such as fixed bed reactors, rotating reactors, moving bed reactors and fluid-bed reactors. The solid phase polycondensation reaction is continued until the desired inherent viscosity of from 0.60 to about 2.50 is reached. This final inherent viscosity is at least 0.10 higher than that reached by the melt phase polymerization. The course of the reaction may be followed by removing samples periodically and determining their inherent viscosity. If a correlation has been developed between inherent viscosity and melt index for the copolyester being prepared, the melt index of periodic samples can be used to follow the reaction.

The properties of these copolyesters can also be modified by incorporation of various conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft polyesters of this invention.

Additionally, if desired, stabilizers may be added to the copolyesters.

If desired, conventional cross-linking agents such as polyfunctional compounds containing 3 or more functional groups (for example hydroxyl, carboxyl or esters thereof) may be used as part of the acid or glycol components in amounts of up to about 5 mol percent. When crosslinking agents are used, it is preferred to use from about 0.05 to about 2 mol percent. Trimellitic anhydride may be used as a small portion of the acid component.

The following examples are submitted for a better understanding of the invention.

EXAMPLE 1

Poly(1,4-cyclohexylenedimethylene-trans-1,4-cyclohexanedicarboxylate) modified with 30 weight percent of 2000 molecular weight polypropyleneether glycol and 18 mol percent of ethylene glycol is prepared by stirring with heating 78.36 grams (0.392 mole) of trans-dimethyl-1,4-cyclohexane-dicarboxylate having a trans isomer content of about 95%, 11.12 grams (0.679 mol) of ethylene glycol, 72.17 grams of a 70% solution of 70% trans-1,4-cyclohexanedimethanol in methanol, 45.0 grams (0.0225 mol) of NIAX 2025 (Union Carbide) polypropyleneether glycol of 2000 molecular weight and a carbon to oxygen atom ratio of 3 to 1, 0.45 gram of stabilizer, and 100 ppm of titanium as titanium tetraisopropoxide. The reaction mixture is stirred at 190° C. for 30 minutes to distill off the methanol, then stirred at 235° C. for 45 minutes. The heat is increased to 270° C. and the reaction mixture is put under reduced pressure (about 0.2 millimeters Hg) for 45 minutes to remove excess glycol. The heat is removed and the reaction mixture let down to atmospheric pressure with nitrogen. The resulting polymer has an inherent viscosity of 0.82 and a melting point of 178° C. It is formed into ⅛ inch pellets and solid-phase polymerized in a stream of hot nitrogen at 150° C. Table 1 shows the increase in inherent viscosity obtained after 10 and 20 hours.

TABLE 1

| Solid-Phase Polymerization Time at 150° C. | Inherent Viscosity |
| --- | --- |
| 0 | 0.82 |
| 10 hours | 0.89 |
| 20 hours | 0.96 |

EXAMPLE 2

A polyester composed of trans-1,4-cyclohexanedicarboxylate having a trans isomer content of about 95%, 70% trans-1,4-cyclohexanedimethanol, 8 mol percent ethylene glycol, 1.5 mol percent trimellitic anhydride (branching agent), and 40 weight percent of 2000 molecular weight polypropyleneether glycol having a carbon to oxygen atom ratio of 3 to 1 is prepared in the melt phase with 100 parts per million of titanium to an inherent viscosity of 0.94. This polyester is ground to pass a ¼ inch screen and solid-phased by passing hot nitrogen through the granules. This polymer is solid-phased at the temperatures and for the times shown in Table 1. As it can be seen in Table 1, solid-phasing of this polymer results in a significant increase in inherent viscosity even though the solid phase temperatures are relatively low.

TABLE 2

SOLID-PHASING POLYESTER ELASTOMERS

| Temperature, °C. | Inherent Viscosity | | |
|---|---|---|---|
| Time hours | 110 | 135 | 155 |
| 0 | 0.94 | 0.94 | 0.95 |
| 4 | 0.93 | 0.97 | 1.32 |
| 8 | 0.92 | 1.01 | |
| 12 | 1.04 | — | |
| 16 | 1.10 | 1.16 | |
| 20 | 1.20 | 1.25 | |
| 24 | 1.27 | 1.31 | |

EXAMPLE 3 (Control)

This example represents a polymer of the prior art. Poly(1,4-cyclohexylenedimethylene-trans-1,4-cyclohexanedicarboxylate) modified with 30 weight percent of 2000 molecular weight polypropyleneether glycol is prepared by stirring with heating 78.3 grams (0.39) of trans-dimethyl-1,4-cyclohexanedicarboxylate having a trans isomer content of about 95%, 89.6 grams (8.41 mol) of 70% trans-1,4-cyclohexanedimethanol, 43.45 grams (0.0217 mol) of NIAX 2025 polypropyleneether glycol of 2000 molecular weight (Union Carbide), 0.5 gram of Irganox 1010, and 100 ppm of titanium as titanium acetyl triisopropoxide. There is no third glycol present. The reaction mixture is stirred at 240° C. for 60 minutes under nitrogen and is allowed to distill. The heat is increased to 265° C. and the reaction mixture is put under reduced pressure (about 0.12 millimeters Hg) for 60 minutes to remove excess glycol. The heat is removed and the reaction mixture let down to atmospheric pressure with nitrogen. The resulting polymer has an inherent viscosity of 0.74. The polymer is ground to pass a 2 mm screen.

EXAMPLE 4

Poly(1,4-cyclohexylenedimethylene-trans-1,4-cyclohexanedicarboxylate) modified with 30 weight percent of 2000 molecular weight polypropyleneether glycol and 15 mol percent of ethylene glycol is prepared by stirring with heating 81.0 grams (5.405 mol) of trans-dimethyl-1,4-cyclohexane-dicarboxylate having a trans isomer content of about 95%, 11.3 grams (0.182 mol) of ethylene glycol, 3120 grams (0.35 mol) of 70% trans-1,4-cyclohexanedimethanol, 45.0 grams (0.0225 mole) of NIAX 2025 polypropyleneether glycol of 2000 molecular weight, 0.15 gram of Irganox 1010, and 100 ppm of titanium as titanium acetyltriisopropoxide. The reaction mixture is stirred at 240° C. for 60 minutes under nitrogen and is allowed to distill. The heat is increased to 265° C. and the reaction mixture is put under reduced pressure (about 0.1 millimeter Hg) for 26 minutes to remove excess glycol. The heat is removed and the reaction mixture let down to atmospheric pressure with nitrogen. The resulting polymer has an inherent viscosity of 1.76. The polymer is ground to pass a 2 min. screen.

The polymers of Examples 2 and 3 are solid-phase polymerized at 150° C. at a reduced pressure of about 0.05 mm. of Hg pressure for the times shown in Table 3. It can be seen that the polymers of instant invention increase in inherent viscosity at a significantly faster rate than those of the prior art.

TABLE 3

| Time, Hours | Inherent Viscosity | |
|---|---|---|
| | Instant Invention Example 3 | Prior Art Example |
| Zero Time | 0.76 | 0.74 |
| 6 | 0.98 | 0.85 |
| 12 | 1.17 | 0.96 |
| 24 | 1.37 | 1.06 |

The examples clearly illustrate that in the particular polyester made in accordance with this invention, a significant advantage is gained by use of the three glycols.

As used herein, the inherent viscosity (I.V.) is measured at 25° C. using 0.50 gram of copolyester per 100 ml. of a solvent consisting of 60 percent by weight phenol and 40 percent by weight tetrachloroethane.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:

1. Method for producing a relatively high molecular weight copolyester which comprises the steps of
   (a) melt-phase copolymerizing to an inherent viscosity of about 0.50 to about 1.10 a dibasic acid component and a glycol component, said dibasic acid component consisting essentially of 1,4-cyclohexanedicarboxylic acid having a transisomer content of at least 70% and said glycol component comprising, based on 100 mol percent glycol, from about 97 to about 70 mol percent 1,4-cyclohexanedimethanol, about 3 to about 30 mol percent of a glycol having 2 to 5 carbon atoms and from about 15 to about 80 weight percent of the total polymer of a polyalkyleneether glycol having a carbon to oxygen atom ratio of from 2 to 1 to 4 to 1 and a molecular weight of from about 400 to about 4000,
   (b) solid-phase polymerizing in particle form the copolyester from step (a) at a temperature of from about 110° C. to about 170° C. to a higher inherent viscosity of from about 0.60 to about 2.50, said higher inherent viscosity being at least 0.10 higher than the inherent viscosity reached in step (a).

2. Method according to claim 1 wherein said glycol component comprises from about 70 to about 97 mol percent 1,4-cyclohexanedimethanol, from about 30 to about 3 mol percent ethylene glycol and about 15 to about 80 weight percent, based on the total weight of the polymer of a polyalkyleneether glycol having a carbon to oxygen atom ratio of from 2 to 1 to 4 to 1 and a molecular weight of from about 400 to about 4000.

3. Method according to claim 1 wherein said glycol component comprises from about 70 to about 97 mol percent 1,4-cyclohexanedimethanol, from about 30 to about 3 mol percent of a glycol having from 2 to 5 carbon atoms and about 15 to about 80 weight percent, based on the total weight of the polymer, of a polyalkyleneether glycol having a carbon to oxygen atom ratio of from 2 to 1 to 4 to 1 and a molecular weight of from about 400 to about 4000, said polyalkyleneether glycol selected from the group consisting of polyethyleneether glycol, polypropyleneether glycol and polytetramethyleneether glycol.

4. Method according to claim 1 wherein the solid phase polymerization is carried out at a temperature about 10° C. below the polymer stick temperature.

5. Method for producing a relatively high molecular weight copolyester which comprises the steps of
   (a) melt-phase copolymerizing to an inherent viscosity of about 0.50 to about 1.10 a dibasic acid component and a glycol component, said dibasic acid component consisting essentially of 1,4-cyclohexanedicarboxylic acid having a transisomer content of at least 50% and said glycol component comprising, based on 100 mol percent glycol, from about 97 to about 70 mol percent 1,4-cyclohexanedimethanol, about 3 to about 30 mol percent ethylene glycol and from about 15 to about 80 weight percent of the total polymer of a polyalkyleneether glycol having a carbon to oxygen atom ratio of from 2 to 1 to 4 to 1 and a molecular weight of from about 400 to about 4000, said polyalkyleneether glycol being selected from the group consisting of polyethyleneether glycol, polypropyleneether glycol and polytetramethyleneether glycol,
   (b) solid-phase polymerizing in particle form the copolyester from step (a) at a temperature of from about 110° C. to about 170° C. to a higher inherent viscosity of from about 0.60 to about 2.50, said higher inherent viscosity being at least 0.10 higher than the inherent viscosity reached in step (a) and said temperature being about 10° C. below the polymer sticking temperature.

* * * * *